US009555780B2

(12) United States Patent
Hong

(10) Patent No.: US 9,555,780 B2
(45) Date of Patent: Jan. 31, 2017

(54) METHOD OF CONTROLLING ELECTRONIC PARKING BRAKE OF VEHICLE HAVING DUAL CLUTCH TRANSMISSION

(71) Applicants: Continental Teves AG & Co. oHG, Frankfurt (DE); Continental Automotive Systems Corporation, Gyeonggi-do (KR)

(72) Inventor: Hyug Gi Hong, Gyeonggi-do (KR)

(73) Assignees: Continental Teves AG & Co. oHG, Frankfurt (DE); Continental Automotive Systems Corporation, Icheon-Si (KR)

( * ) Notice: Subject to any disclaimer, the term of this patent is extended or adjusted under 35 U.S.C. 154(b) by 0 days.

(21) Appl. No.: 14/436,212

(22) PCT Filed: Oct. 23, 2013

(86) PCT No.: PCT/EP2013/072184
§ 371 (c)(1),
(2) Date: Apr. 16, 2015

(87) PCT Pub. No.: WO2014/064158
PCT Pub. Date: May 1, 2014

(65) Prior Publication Data
US 2015/0258971 A1 Sep. 17, 2015

(30) Foreign Application Priority Data
Oct. 23, 2012 (KR) .................. 10-2012-0117794

(51) Int. Cl.
*G06F 7/70* (2006.01)
*G06F 19/00* (2011.01)
(Continued)

(52) U.S. Cl.
CPC ............. *B60T 7/122* (2013.01); *B60T 8/245* (2013.01); *B60T 8/3205* (2013.01);
(Continued)

(58) Field of Classification Search
CPC ........ B60T 2270/406; B60T 7/04; B60T 7/06; B60T 7/122; B60T 7/12; B60T 7/42; B60T 13/14; B60T 2201/022; B60T 2201/024; B60T 2201/03; B60T 2201/04; B60T 2270/403; F16H 2061/223; F16H 59/14; F16H 59/54; F16H 2200/0052; F16H 61/02; F16H 61/14; B60W 2510/104; B60W 2520/125; B60W 2540/10; B60W 2540/22; B60W 2040/0872; B60W 2510/244
(Continued)

(56) References Cited

U.S. PATENT DOCUMENTS 4,295,540 A * 10/1981 Hildebrecht ............ F02D 17/04
123/198 D
4,561,527 A * 12/1985 Nakamoto ................ B60T 7/12
188/2 D
(Continued)

FOREIGN PATENT DOCUMENTS

DE 102005032152 3/2006
DE 102005034522 3/2006
(Continued)

OTHER PUBLICATIONS

International Search Report for International Application No. PCT/EP2013/072184 mailed Jan. 21, 2014.
(Continued)

*Primary Examiner* — Calvin Cheung
*Assistant Examiner* — Luis A Martinez Borrero
(74) *Attorney, Agent, or Firm* — RatnerPrestia

(57) ABSTRACT

A method of controlling an electronic parking brake of a vehicle having a dual clutch transmission. The method
(Continued)

includes: identifying a slope of an area in which the vehicle is located in order to determine whether the identified slope exceeds a predetermined slope value; determining whether both of two clutches are opened in a safe mode when the identified slope exceeds the predetermined slope value; determining whether the vehicle moves upward in a front direction when both of the two clutches are opened; and operating the electronic parking brake when the vehicle moves upward in the front direction. When the vehicle moves upward in the front direction on the inclined road, the electronic parking brake is automatically operated to prevent the vehicle from slipping in the rear direction. Therefore, the method can effectively improve the safety of the driver and vehicle even when the driver is inept in pedal operation.

4 Claims, 2 Drawing Sheets

(51) Int. Cl.
| | | |
|---|---|---|
| G06G 7/00 | (2006.01) | |
| G06G 7/76 | (2006.01) | |
| B60T 7/12 | (2006.01) | |
| B60W 10/18 | (2012.01) | |
| B60W 10/113 | (2012.01) | |
| B60W 30/18 | (2012.01) | |
| B60T 8/24 | (2006.01) | |
| B60T 8/32 | (2006.01) | |
| F16H 63/48 | (2006.01) | |

(52) U.S. Cl.
CPC ........ B60W 10/113 (2013.01); B60W 10/182 (2013.01); B60W 30/18118 (2013.01); F16H 63/48 (2013.01); B60T 2201/06 (2013.01); B60W 2520/06 (2013.01); B60W 2520/10 (2013.01); B60W 2550/142 (2013.01); B60W 2710/186 (2013.01)

(58) Field of Classification Search
USPC .......... 701/70, 1, 22, 23, 37, 71, 74, 78, 93, 99,701/48, 41, 50, 51, 82, 112, 116, 2, 49, 53
See application file for complete search history.

(56) References Cited

U.S. PATENT DOCUMENTS

| | | | | |
|---|---|---|---|---|
| 5,485,764 A * | 1/1996 | Sugimoto | ................ | B60T 7/047 188/2 D |
| 5,769,189 A * | 6/1998 | Heibel | .................. | B60T 11/046 188/106 P |
| 6,279,692 B1 * | 8/2001 | Siepker | ................. | B60T 11/103 188/105 |
| 6,425,643 B2 * | 7/2002 | Shirai | ..................... | B60T 7/042 188/1.11 E |
| 6,679,810 B1 * | 1/2004 | Boll | ........................ | B60T 7/122 477/191 |
| 6,708,097 B1 * | 3/2004 | Vohmann | ................ | F16D 48/06 180/170 |
| 6,863,162 B1 * | 3/2005 | Gabas | .................. | B60T 13/741 188/156 |
| 6,905,181 B2 * | 6/2005 | Iwagawa | ................ | B60T 7/107 188/162 |
| 6,913,121 B2 * | 7/2005 | Park | ........................ | B60T 7/122 188/156 |
| 7,374,511 B2 * | 5/2008 | Berger | ................. | B60W 10/113 477/99 |
| 7,407,463 B2 | 8/2008 | Kinder | | |
| 7,720,588 B2 | 5/2010 | Alvarez | | |
| 8,371,265 B1 * | 2/2013 | Call | ..................... | B60R 25/042 123/198 DB |
| 8,447,475 B2 | 5/2013 | Desfriches | | |
| 8,463,520 B2 * | 6/2013 | Febrer | .................... | B60T 7/122 701/70 |
| 8,556,776 B2 | 10/2013 | Mair | | |
| 8,924,115 B2 * | 12/2014 | Rahman | .................. | B60T 7/042 477/174 |
| 9,014,930 B2 * | 4/2015 | Kurosaki | ................ | B60T 7/122 701/53 |
| 2003/0220172 A1 * | 11/2003 | Luh | ....................... | B60W 10/02 477/175 |
| 2004/0016612 A1 * | 1/2004 | Iwagawa | ................. | B60T 7/107 188/265 |
| 2006/0037804 A1 * | 2/2006 | Sugo | ................... | B60K 23/0808 180/249 |
| 2006/0106520 A1 * | 5/2006 | Bodin | ...................... | B60T 7/122 701/67 |
| 2006/0113158 A1 * | 6/2006 | Popp | ....................... | B60T 8/885 192/220 |
| 2008/0071454 A1 * | 3/2008 | Shiraki | ..................... | B60L 7/24 701/70 |
| 2008/0071455 A1 * | 3/2008 | Shiraki | ............... | B60L 15/2018 701/70 |
| 2008/0071456 A1 * | 3/2008 | Shiraki | ................... | B60T 7/122 701/70 |
| 2008/0173518 A1 | 7/2008 | Klusemann | | |
| 2008/0190718 A1 | 8/2008 | Klusemann | | |
| 2008/0254936 A1 * | 10/2008 | Yang | ........................ | B60K 1/02 477/5 |
| 2009/0045026 A1 * | 2/2009 | Ishii | ........................ | F16H 3/006 192/48.614 |
| 2009/0312144 A1 * | 12/2009 | Allgaier | ................... | B60K 6/48 477/5 |
| 2010/0114443 A1 * | 5/2010 | Terwart | ................. | F16D 48/066 701/68 |
| 2010/0179738 A1 * | 7/2010 | Desfriches | ....... | B60W 30/18118 701/68 |
| 2010/0235064 A1 * | 9/2010 | Mallet | ..................... | B60T 7/122 701/70 |
| 2010/0252378 A1 * | 10/2010 | Hilberer | .................. | B60T 7/107 188/106 F |
| 2010/0262329 A1 * | 10/2010 | Monti | ..................... | B60T 7/122 701/31.4 |
| 2012/0245815 A1 * | 9/2012 | Schneider | ............... | B60T 7/107 701/70 |
| 2012/0271523 A1 * | 10/2012 | Sardari Iravani | ....... | B60T 7/122 701/70 |
| 2013/0073163 A1 * | 3/2013 | Liu | ....................... | B60T 7/042 701/70 |
| 2013/0103277 A1 * | 4/2013 | Attallah | .................. | B60T 7/122 701/70 |
| 2013/0275019 A1 * | 10/2013 | Murata | ..................... | B60T 7/12 701/70 |
| 2014/0144730 A1 * | 5/2014 | Schwarz | ................. | B60T 7/042 188/72.3 |
| 2015/0142272 A1 * | 5/2015 | Kim | ........................ | B60T 7/12 701/48 |
| 2015/0175137 A1 * | 6/2015 | Murata | ................... | B60T 7/107 701/70 |
| 2015/0274139 A1 * | 10/2015 | Okada | ....................... | B60T 8/17 701/70 |

FOREIGN PATENT DOCUMENTS

| | | |
|---|---|---|
| DE | 102009046495 | 5/2011 |
| EP | 1593566 | 11/2005 |
| EP | 1630055 | 3/2006 |
| EP | 2357112 | 8/2011 |
| EP | 2380790 | 10/2011 |
| FR | 2918336 | 1/2009 |
| GB | 2192439 | 1/1988 |
| GB | 2376990 | 12/2002 |

(56) References Cited

FOREIGN PATENT DOCUMENTS

| | | |
|---|---|---|
| WO | 2004106131 | 12/2004 |
| WO | 2006013174 | 2/2006 |

OTHER PUBLICATIONS

Written Opinion of the International Searching Authority for International Application No. PCT/EP2013/072184 mailed Jan. 21, 2014.

\* cited by examiner

METHOD OF CONTROLLING ELECTRONIC PARKING BRAKE OF VEHICLE HAVING DUAL CLUTCH TRANSMISSION

CROSS REFERENCE TO RELATED APPLICATIONS

This application is the U.S. National Phase Application of PCT International Application No. PCT/EP2013/072184, filed Oct. 23, 2013, which claims priority to Korean Patent Application No. 10-2012-0117794, filed Oct. 23, 2012, the contents of such applications being incorporated by reference herein.

BACKGROUND OF THE INVENTION

Field of the Invention

The present disclosure relates to a method of controlling an electronic parking brake of a vehicle having a dual clutch transmission, and more particularly to a method of controlling an electronic parking brake of a vehicle having a dual clutch transmission which is capable of preventing a slip phenomenon on an inclined road.

Description of the Prior Art

With the increase of methods of electronically controlling various kinds of devices provided in a vehicle, although mechanical brakes, in which a gear ratio is changed by shifting a lever, had been used as a vehicle brake in the past, there is also a tendency of increase in use of electronic parking brakes, each of which is connected to a brake pedal only to be electrically controllable.

The electronic parking brake, which is a system configured to control a brake of a vehicle by determining the current state of the vehicle and the intention of a driver after sensing a pedal operating value by the driver, may be controlled based on the information transferred through a Controller Area Network (CAN) communication between a transmission control unit configured to control a transmission and an engine management system.

Meanwhile, a dual clutch transmission, which has been recently developed for more exact and rapid control of the transmission of a vehicle, enables individual controls of odd gear sets and even gear sets.

FIG. 1 is a schematic view showing a dual clutch transmission according to the prior art.

As shown in FIG. 1, the dual clutch transmission includes two clutches, a shaft controllably connected to the odd and even gear sets, and four synchronizers configured to synchronize with the gear sets.

In order to control a dual clutch transmission, a transmission control unit may change gear ratios by controlling the two clutches such that a vehicle travelling state corresponds to preset information about vehicle speeds and a driver's accelerator pedal operating rate.

In the case of a dual clutch transmission according to the prior art, if a dangerous situation occurs, all clutches are separated from the shaft, so that the driving power generated from an engine may be cut off from a driving shaft.

However, in this case, a vehicle slip phenomenon may occur on an inclined road and if a driver does not recognize the fact and thus fails to execute a proper brake operation, a big traffic accident may occur in a dangerous situation.

SUMMARY OF THE INVENTION

Accordingly, the present disclosure has been made to solve the above-mentioned problems occurring in the prior art, and an aspect of the present disclosure is to provide a method of controlling an electronic parking brake of a vehicle having a dual clutch transmission which is capable of preventing a vehicle from slipping rearward on an inclined road.

The present disclosure is not limited to the above aspect, and other aspects of the present disclosure will be clearly comprehended based on the following description by those skilled in the art.

In order to accomplish this, there is provided a method of controlling an electronic parking brake of a vehicle having a dual clutch transmission. The method includes identifying a slope of an area in which the vehicle is located in order to determine whether the identified slope exceeds a predetermined slope value; determining whether both of two clutches are opened in a safe mode when the identified slope exceeds the predetermined slope value; determining whether the vehicle moves upward in a front direction when both of the two clutches are opened; and operating the electronic parking brake when the vehicle moves upward in the front direction.

The method may further include determining whether a travelling speed of the vehicle exceeds a predetermined speed; and operating the electronic parking brake when the travelling speed of the vehicle exceeds the predetermined speed.

Meanwhile, the method may further include terminating an operation of the electronic parking brake when a signal of releasing an automatic control of the electronic parking brake according to an intention of a driver is transferred.

According to an aspect of the present disclosure, a method of controlling an electronic parking brake of a vehicle having a dual clutch transmission is provided. By the method, when the vehicle moves upward in the front direction on the inclined road, the electronic parking brake is automatically operated to prevent the vehicle from slipping in the rear direction. As a result, the method can effectively improve the safety of a driver and a vehicle even when the driver is inept in pedal operation.

BRIEF DESCRIPTION OF THE DRAWINGS

The above and other aspects, features and advantages of the present disclose will be more apparent from the following detailed description taken in conjunction with the accompanying drawings, in which.

DETAILED DESCRIPTION OF THE EXEMPLARY EMBODIMENTS

Hereinafter, an exemplary embodiment of the present disclose will be described with reference to the accompanying drawings. In the following description, a detailed description of known functions and configurations incorporated herein will be omitted when it may make the subject matter of the present invention rather unclear.

Figure 1:
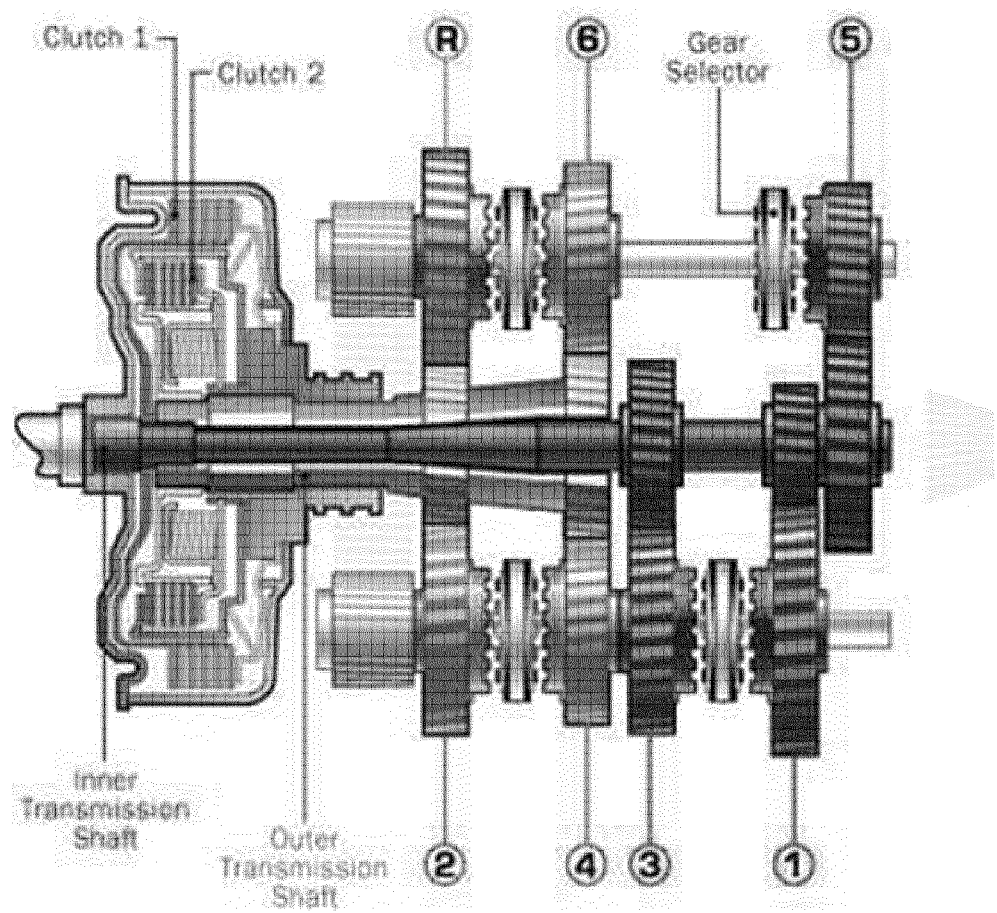
FIG. 1 is a schematic view showing a dual clutch transmission according to the prior art.
Figure 2:
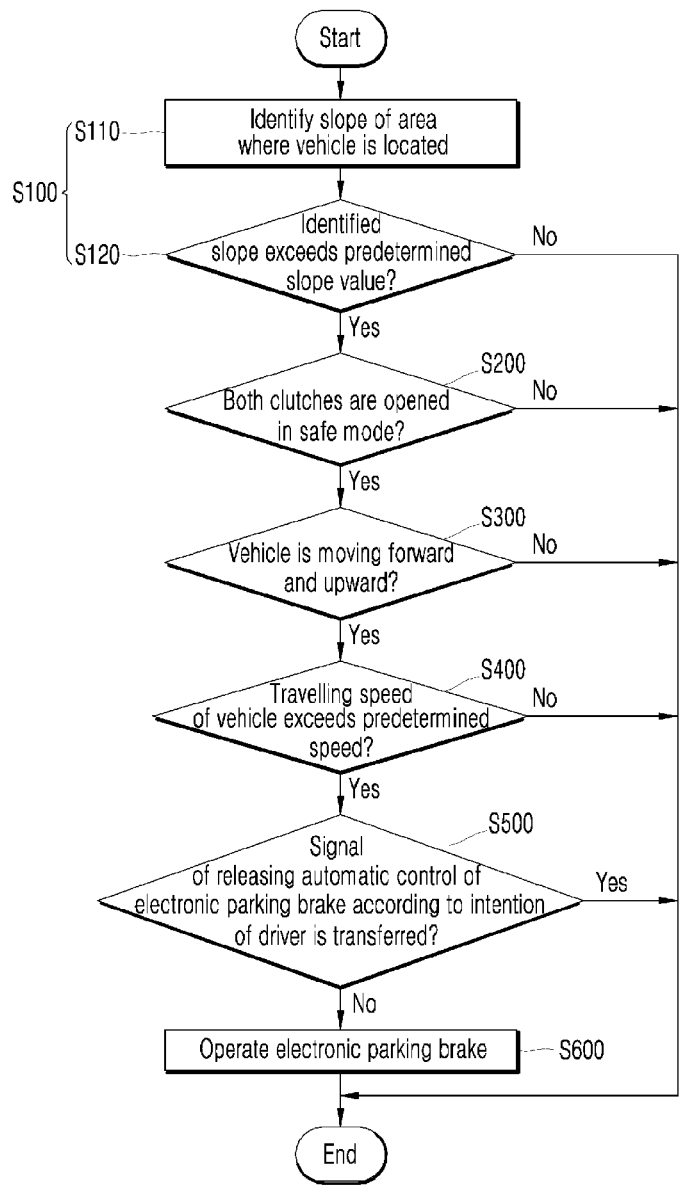
FIG. 2 is a flowchart illustrating a method of controlling an electronic parking brake of a vehicle having a dual clutch transmission according to one embodiment of the present disclosure.

FIG. 2 is a flowchart illustrating a method of controlling an electronic parking brake of a vehicle having a dual clutch transmission according to one embodiment of the present disclosure.

As shown in FIG. 2, a method of controlling an electronic parking brake of a vehicle having a dual clutch transmission according to one embodiment of the present disclosure includes: determining whether an identified slope exceeds a predetermined slope value (step S100), determining whether both of two clutches are opened in a safe mode (step S200), determining whether the vehicle is moving in a forward-and-upward direction when both of the two clutches are opened (step S300), and operating the electronic parking brake (step S600).

The step of determining whether an identified slope exceeds a predetermined slope value (step S100) includes: identifying the slope of an area in which the vehicle is located (step S110); and determining whether the identified slope exceeds a predetermined slope value so that a clutch operating situation for preventing slipping of the vehicle may occur (step S120).

The method of controlling an electronic parking brake of a vehicle according to one embodiment of the present disclosure may prevent the vehicle from slipping rearward due to the clutch operation and the transmission gear shifting of the vehicle when the vehicle passes through the slope area having a predetermined angle or more.

Accordingly, in step S100, a slope value of a predetermined angle, at which the vehicle may slip rearward, is preset and a slope value of an area in which the vehicle is currently located is input (step S110), and it may be then determined whether the input slope value exceeds the preset slope value (step S120).

When the slope value of the current located area of the vehicle exceeds the preset slop value, it may be determined whether both of the two clutches are opened in a safe mode (step S200).

In the step of determining whether both of the two clutches are opened in a safe mode (step S200), it is determined whether both of the two clutches are opened to prevent the revolution power transferred from the vehicle engine from being transferred to the driving shaft in the safe mode of the electronic parking brake when the vehicle enters the inclined area of a predetermined angle or more so that a slip phenomenon may occur.

When the slip phenomenon occurs while the vehicle is being driven in the inclined area, if both of the two clutches are opened and the driver makes a mistake in operating a brake pedal, there is a danger of causing a big traffic accident.

Thus, it is determined in step S200 whether both of the two clutches are opened due to the execution of the safe mode rather than the intention of the driver. Then, when both clutches are opened so that the slip phenomenon may occur, the next step (step S300) is performed as follows.

If both clutches are opened in the safe mode, it may be determined whether the vehicle moves upward in a front direction (step S300).

In the step of determining whether the vehicle moves upward in a front direction (step S300), since the slip phenomenon of the vehicle occurs while the vehicle is moving on the upward inclined road in the front direction, even though it is identified in the previous step that the vehicle exists on the inclined road at the predetermined angle or more, it is determined whether the vehicle moves upward in a front direction.

In order to determine whether the vehicle moves in a front direction, it is possible to determine whether the gear of the vehicle is in a drive mode. The determining of whether the vehicle moves upward is performed based on the slope angle determined through the previous step (step S100) or by using a device such as a gravitation sensor.

However, this is only one embodiment of the present disclosure and various methods which can determine whether the vehicle is moving upward in a front direction may be included within the scope of the present disclosure.

In this case, when the vehicle is moving upward in a front direction (step S300), a step of operating the electronic parking brake may be performed (step S600).

In the step of operating the electronic parking brake (step S600), since an accident may occur if the driver does not properly operate a brake pedal when both clutches are opened in the safe mode and the vehicle slips rearward on the inclined road while the vehicle having the dual clutch transmission is moving upward in the front direction on the inclined road, the electronic parking brake is operated to allow a brake to be automatically operated.

In this case, the method of controlling an electronic parking brake of a vehicle having a dual clutch transmission according to one embodiment of the present disclosure may further include the steps of: determining whether a travelling speed of the vehicle exceeds a predetermined speed (step S400); and operating the electronic parking brake when the travelling speed of the vehicle exceeds the predetermined speed (step S600).

In the step of determining of whether the travelling speed of the vehicle exceeds the predetermined speed (step S400), since there is a need to operate the electronic parking brake according to the embodiment when the vehicle is moving at the predetermined speed or above, it is determined whether the travelling speed of the vehicle exceeds the predetermined speed in order to determine whether there is a need to operate the electronic parking brake.

If the speed of the vehicle does not exceed the predetermined speed, the possibility of causing an accident is low. In this case, an accident may be sufficiently prevented only by the operation of the brake according to the brake pedal operation by the driver.

When the vehicle speed exceeds the predetermined speed so that there is a need to operate the electronic parking brake, the step of operating the electronic parking brake may be performed (step S600).

Meanwhile, in the electronic parking brake control method of the vehicle including a dual clutch transmission according to the embodiment of the present disclosure, it is determined whether a signal of releasing an automatic control of the electronic parking brake is transferred according to the intention of a driver and the operation of the electronic parking brake may be then terminated when the signal has been transferred (step S500).

The driver may not desire to automatically control the electronic parking brake. In this case, the signal of releasing the automatic control of the electronic parking brake may be transferred to the vehicle by operating a device, for example, pressing a button.

If the signal of releasing the automatic control of the electronic parking brake is transferred from the driver, the intention of the driver is accepted and the operation of the electronic parking brake is terminated. Then, even when all of the conditions described above are met, the electronic parking brake may not be operated.

To the contrary, when it is determined that the signal of releasing the automatic control of the electronic parking brake is not transferred from the driver, if all of the conditions described above are met, the electronic parking brake may be operated to prevent the occurrence of an accident in advance.

A method of controlling an electronic parking brake of a vehicle having a dual clutch transmission according to one embodiment of the present disclosure has been described in detail.

According to the present disclosure, when the vehicle moves upward in the front direction on the inclined road, the electronic parking brake is automatically operated to prevent the vehicle from slipping in the rear direction. As a result, a method according to the present disclosure can effectively improve the safety of a driver and a vehicle even when the driver is inept in pedal operation.

Although an exemplary embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method of controlling an electronic parking brake of a vehicle having a dual clutch transmission, the method comprising:

identifying a slope of an area in which the vehicle is located in order to determine whether the identified slope exceeds a predetermined slope value;

determining whether both of two clutches are separated from a drive shaft of the vehicle due to execution of a safe mode when the identified slope exceeds the predetermined slope value;

determining whether the vehicle moves forward-and-upward in a front direction when both of the two clutches are opened; and automatically operating the electronic parking brake to brake the vehicle without driver intervention when the vehicle moves forward-and-upward in the front direction in order to prevent the vehicle from slipping rearward.

2. The method of claim 1, further comprising:

determining whether a travelling speed of the vehicle exceeds a predetermined speed; and operating the electronic parking brake when the travelling speed of the vehicle exceeds the predetermined speed.

3. The method of claim 1, further comprising:

terminating an operation of the electronic parking brake when a signal for releasing an automatic control of the electronic parking brake according to an intention of a driver is transferred.

4. The method of claim 2, further comprising:

terminating an operation of the electronic parking brake when a signal for releasing an automatic control of the electronic parking brake according to an intention of a driver is transferred.

* * * * *